US 6,612,167 B2

(12) United States Patent
Kamiya (10) Patent No.: US 6,612,167 B2
(45) Date of Patent: Sep. 2, 2003

(54) AIR FLOW METER HAVING TURBULENCE REDUCTION MEMBER (75) Inventor: Shinichi Kamiya, Kariya (JP)

(73) Assignee: Denso Corporation (JP)

(*) Notice: Subject to any disclaimer, the term of this patent is extended or adjusted under 35 U.S.C. 154(b) by 0 days.

(21) Appl. No.: 09/832,123

(22) Filed: Apr. 11, 2001

(65) Prior Publication Data

US 2001/0037678 A1 Nov. 8, 2001

(30) Foreign Application Priority Data

Apr. 17, 2000 (JP) ........................................ 2000-121048
Feb. 28, 2001 (JP) ........................................ 2001-054078

(51) Int. Cl.$^7$ ................................................. G01F 1/68
(52) U.S. Cl. ................................................. 73/204.22
(58) Field of Search ............................ 73/204, 204.22, 73/202, 202.5, 204.11, 204.21, 204.25, 204.27, 118.1

(56) References Cited

U.S. PATENT DOCUMENTS

| 5,243,859 A |   | 9/1993 | Kobayashi et al. |
| 5,537,870 A | * | 7/1996 | Zuerk et al. .................. 73/202 |
| 5,595,163 A | * | 1/1997 | Nogi et al. .................. 123/494 |
| 5,631,415 A | * | 5/1997 | Igarashi et al. ............. 73/202.5 |
| 5,804,718 A | * | 9/1998 | Nagasaka et al. ............. 73/202 |
| 6,220,090 B1 | * | 4/2001 | Kohno et al. .................. 73/202 |

FOREIGN PATENT DOCUMENTS

| JP | 8-285659 | 11/1996 |
| JP | 11-248504 | 9/1999 |
| JP | 11-325998 | 11/1999 |

OTHER PUBLICATIONS

USSN 09/160,548 (Takiguchi et al.) filed Sep. 25, 1998 (Our Ref.: 2018–172).

* cited by examiner

Primary Examiner—Hezron Williams
Assistant Examiner—Jewel V. Thompson
(74) Attorney, Agent, or Firm—Nixon & Vanderhye PC

(57) ABSTRACT

A U-shaped bypass passage is provided in an intake pipe. A part of air flowing in the intake pipe is introduced into the bypass passage. The bypass passage is arranged substantially perpendicularly to a primary air flow direction in the intake pipe. A flow meter element is disposed in the bypass passage for measuring air flow amount. Turbulence reduction plates are integrally formed with the bypass passage at an upper side and a lower side of an air inlet thereof. The turbulence reduction plates are arranged substantially in parallel with the primary air flow direction in the intake pipe, and substantially perpendicularly to an air flow direction in the bypass passage. Even when a secondary air flow arises around the air inlet of the bypass passage, the turbulence reduction plates shut the secondary air flow, thereby reducing an influence of the secondary air flow.

22 Claims, 6 Drawing Sheets

AIR FLOW METER HAVING TURBULENCE REDUCTION MEMBER

CROSS REFERENCE TO RELATED APPLICATION

This application is based on and incorporates herein by reference Japanese Patent Application Nos. 2000-121048 filed on Apr. 17, 2000, and 2001-54078 filed on Feb. 28, 2001.

BACKGROUND OF THE INVENTION

1. Field of the Invention

The present invention relates to an air flow meter having a flow meter element, suitable for use in an intake pipe of vehicle internal combustion engine.

2. Description of Related Art

An air flow meter is used for measuring intake air flow amount of an internal combustion engine. The air flow meter is disposed in a bypass passage within an engine intake pipe. The air flow meter has a flow meter element and a heat sensing element, and measures the intake air flow mount base on a value of electric current supplied into the flow meter element.

When the engine operates, the intake air flow amount fluctuate relatively remarkably, so that pulsating flow arises in the intake air flow. The pulsating flow disorders an air flow introduced into the bypass passage, thereby causing a measurement error of the intake air flow amount.

JP-A-8-285659 discloses an air flow meter in which two turbulence reduction grills are provided. The turbulence reduction grills are disposed at an inlet of main air passage and arranged in parallel with each other. Grill directions of these turbulence reduction grills are off-set by 45 degrees to reduce turbulence in the intake air flowing into the main air passage, thereby stabilizing air which flows into the bypass passage.

However, since two turbulence reduction grills are provided at the inlet of the main air flow passage, pressure loss is increased in the main air passage, thereby worsening an engine performance. Further, costs for forming two turbulence reduction grills and for press-inserting or insert-forming the turbulence reduction grills to the inlet of the main air flow passage are increased.

SUMMARY OF THE INVENTION

An object of the present invention is to reduce an influence of pulsating flow without increasing a pressure loss by a simple structure, thereby improving measurement accuracy with reducing manufacturing cost and the pressure loss.

According to a first aspect of the present invention, a U-shaped bypass passage is provided in an air passage. The bypass passage is arranged substantially perpendicularly to a primary air flow direction in the air passage and defines an air inlet. A turbulence reduction plate is provided around an air inlet of the bypass passage, and the turbulence reduction plate is arranged substantially in parallel with the primary air flow direction in the air passage, and substantially perpendicularly to an air flow direction in the bypass passage.

Even when a secondary air flow, of which direction is in parallel with an air flow direction in the bypass passage, arises around the air inlet of the bypass passage, the turbulence reduction plate shuts the secondary air flow, thereby reducing an influence of the secondary air flow. Thus, air flow introduced into the bypass passage is stabilized, thereby improving the air flow amount measurement accuracy. Here, the turbulence reduction plate is disposed substantially in parallel with a primary air flow direction in the air passage, so that pressure loss caused by the turbulence reduction plate is enough small, thereby introducing no influence on an engine efficiency. Further, the turbulence reduction plate is simply structured and provided, thereby reducing the manufacturing cost.

According to a second aspect of the present invention, the bypass passage includes two fluid passage next to and in parallel with each other, and a bent portion connecting the two fluid passages. A partition wall partitions the two fluid passages, and a venturi is formed at the air inlet side of the partition wall. The turbulence reduction plate is disposed at a position facing around a center of the venturi.

Thus, the primary air flowing into the venturi is prevented from being disordered while the turbulence reduction plate effectively reduces the influence of the secondary flow, so that stable venturi effect can be attained. The air having passed through the venturi introduces negative pressure acting on an air outlet of the bypass passage, so that the air flow speed in the bypass passage is increased, thereby improving the air flow amount measurement accuracy.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
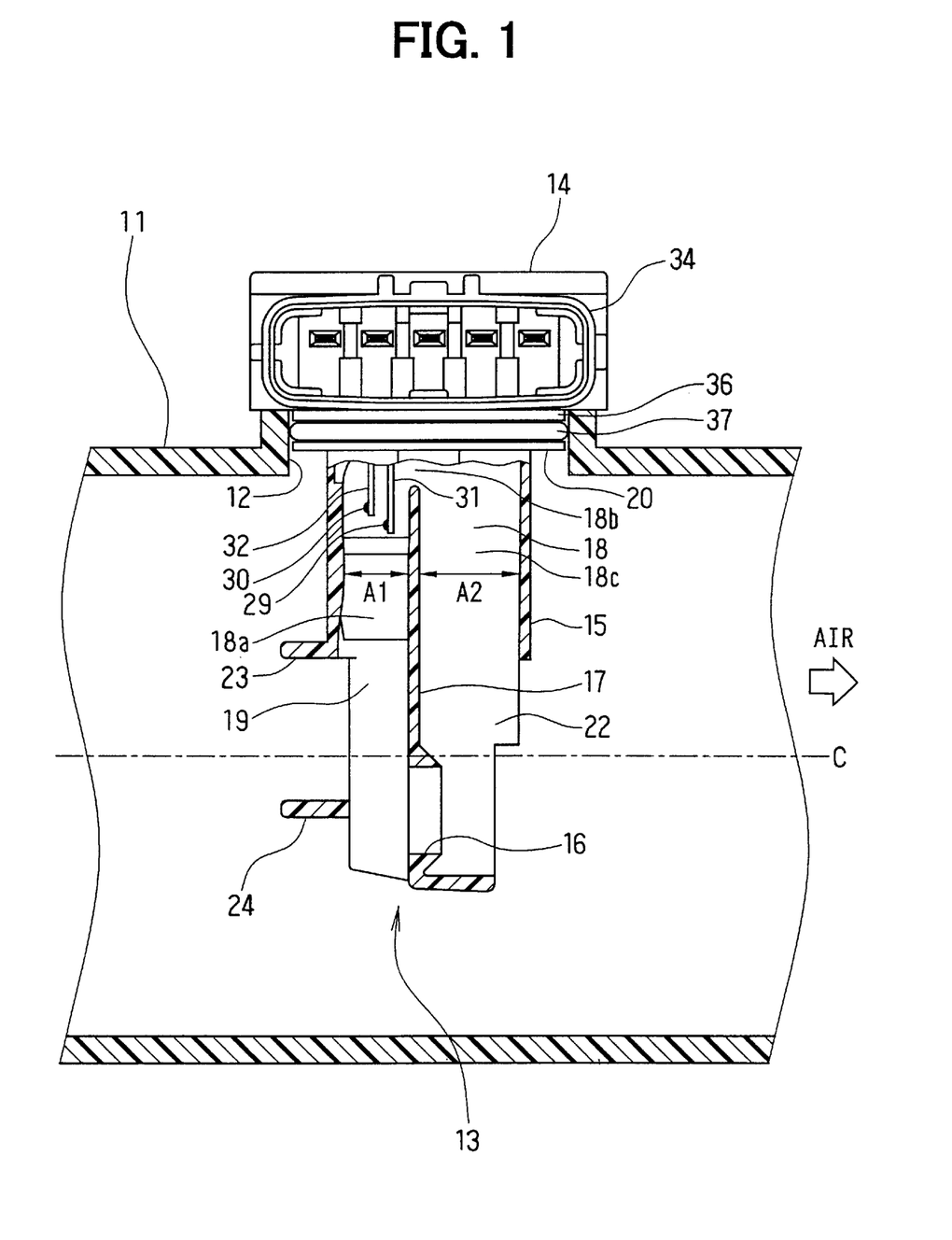
FIG. 1 is a cross-sectional side view showing an attachment position of the air flow meter.
Figure 2:
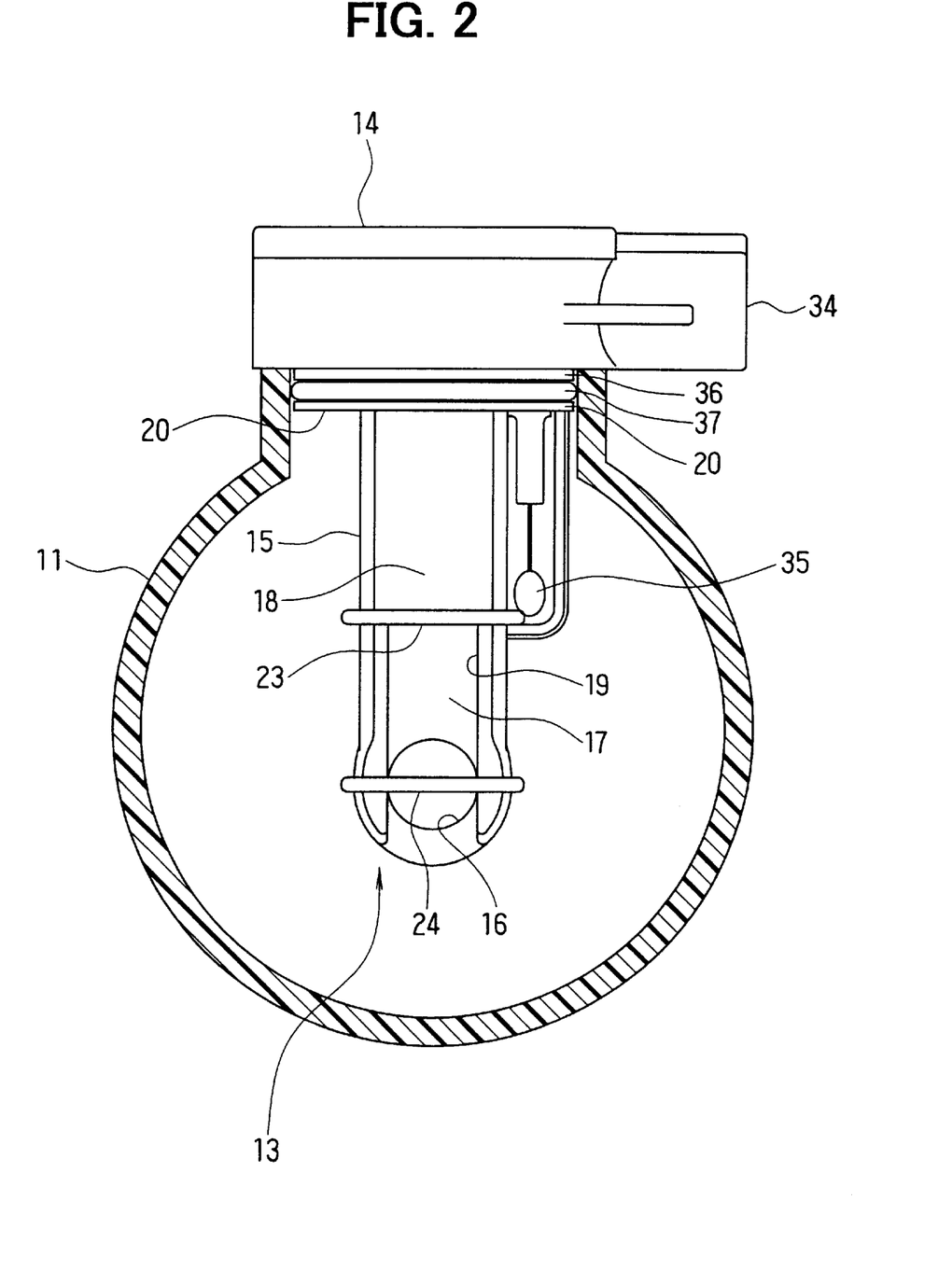
FIG. 2 is a front view showing the attachment state of the air flow meter.

As shown in FIGS. 1 and 2, an air flow meter 13 is attached to a mounting hole 12 of an intake pipe 11 of internal combustion engine. The air flow meter 13 includes a circuit module 14 and a flow meter unit 15. The flow meter unit 15 is rectangular cylindrically formed, and extends from the mounting hole 12 toward the center axis of the intake pipe 11. The flow meter unit 15 includes an upstream side fluid passage 18a and a downstream side fluid passage 18c. The upstream side fluid passage 18a and the downstream side fluid passage 18c extend in the radial direction of the intake pipe 11, and provide a partition wall 17 therebetween. The upstream side fluid passage 18a extends in parallel with the downstream side fluid passage 18c, and communicates with the downstream side fluid passage 18c through a bent portion 18b. In this way, a U-shaped bypass passage 18 is formed in the flow meter unit 15. The cross sectional area A1 of the upstream side fluid passage 18a is smaller than the cross sectional area A2 of the downstream side fluid passage 18c.

The flow meter unit 15 includes an air inlet 19 at the upstream side thereof. A part of primary air flowing in the intake pipe 11 is introduced into the upstream side fluid passage 18a through the air inlet 19. A venturi 16 is integrally formed at the lower end of the partition wall 17. The venturi 16 is in parallel with a primary air-flow direction. An air outlet 22 of the bypass passage 18 is formed above the venturi 16. Air having passed through the bypass passage 18 merges with the air having passed through the venturi 16 at the downstream side of the venturi 16.

Turbulence reduction plates 23, 24 are integrally resin formed at the upper side and lower side of the air inlet 19, respectively. The turbulence reduction plates 23, 24 are arranged in parallel with the primary air-flow direction, and perpendicularly to an air-flow direction in the bypass passage 18. The lower turbulence reduction plate 24 is located to face a center portion of the venturi 16. As shown in FIG. 2, latitudinal width of each turbulence reduction plate 23, 24 is approximately the same as or slightly larger than the latitudinal width of the bypass passage 18. As shown in FIG. 1, axial protrusion length of each turbulence reduction plate 23, 24 is set as large as possible within a range not to prevent the flow meter unit 15 from being inserted into the mounting hole 12 of the intake pope 11. The turbulence reduction plates 23, 24 are formed such that they protrude toward the upstream side of the intake pipe 11.

The circuit module 14 covers the top opening of the flow meter unit 15. A flow meter element (heat generating element) 29 and a heat sensing element 30 are respectively attached below the circuit module 14 by support members 31, 32 while providing a predetermined interval therebetween. The flow meter element 29 and the heat sensing element 30 are disposed at an upper area of the upstream side fluid passage 18a. Here, since the cross sectional area A1 of the upstream side fluid passage 18a is smaller than the cross sectional area A2 of the downstream side fluid passage 18c, air-flow speed in the upstream side fluid passage 18a is larger than that in the downstream side fluid passage 18c. As the air-flow speed is higher, flow measurement accuracy is more improved. Thus, the flow meter element 29 is disposed in the upstream side fluid passage 18a. Since the heat sensing element 30 detects a temperature of the air touching the flow meter element 29, the heat sensing element 30 is required to be disposed close to the flow meter element 29 within a range that radiation of the flow meter element 29 does not influence the heat sensing element 30.

A circuit board (not illustrated) controlling a current supply into the flow meter element 29 and the heat sensing element 30 is installed in the circuit module 14. A connector 34 for connecting a wire harness (not illustrated) is insert-formed at the side wall of the circuit module 14. An intake air temperature sensor 35 (see FIG. 2) is disposed below the circuit module 14, and protrudes downwardly. The intake air temperature sensor 35 is located next to the flow meter unit 15 to detect a temperature of the air flowing through the intake pipe 11.

The circuit module 14 includes a fitting projection 36 at the bottom surface thereof, and a flange 20 of the flow meter unit 15 is fused or adhered to the fitting projection 36. An O-ring 37 is provided at the outer periphery surface of the fitting projection 36, and seals the inner surface of the mounting hole 12. The air flow meter 13 is screwed to the mounting hole 12 by plug-in method while the bottom surface of the circuit module 14 contacts the upper edge of the mounting hole 12.

In the air flow meter 13, a part of primary air flowing through the intake pipe 11 is distributed into the upstream side fluid passage 18a and the venturi 16. The air introduced into the upstream side fluid passage 18a changes the flow direction thereof substantially perpendicularly to the primary air flow direction, and flows through the bypass passage 18, i.e., upstream side fluid passage 18a, bent portion 18b, and downstream side fluid passage 18c. The air having passed through the bypass passage 18 merges with the air having passed through the venturi 16 at the downstream side of the venturi 16. At the merging portion, the air having passed through the venturi 16 introduces negative pressure acting on the air outlet 22 of the bypass passage 18, so that the air flow speed in the bypass passage 18 is increased. The circuit module 14 controls an electric current supplied into the flow meter element 29 such that a temperature difference between temperature of heat generated by the flow meter element 29 and temperature detected by the heat sensing element 30 is constant. Bypass air flow amount is measured based on the electric current value at the air flow meter element 29, and the intake air flow amount is attained.

Figure 3:
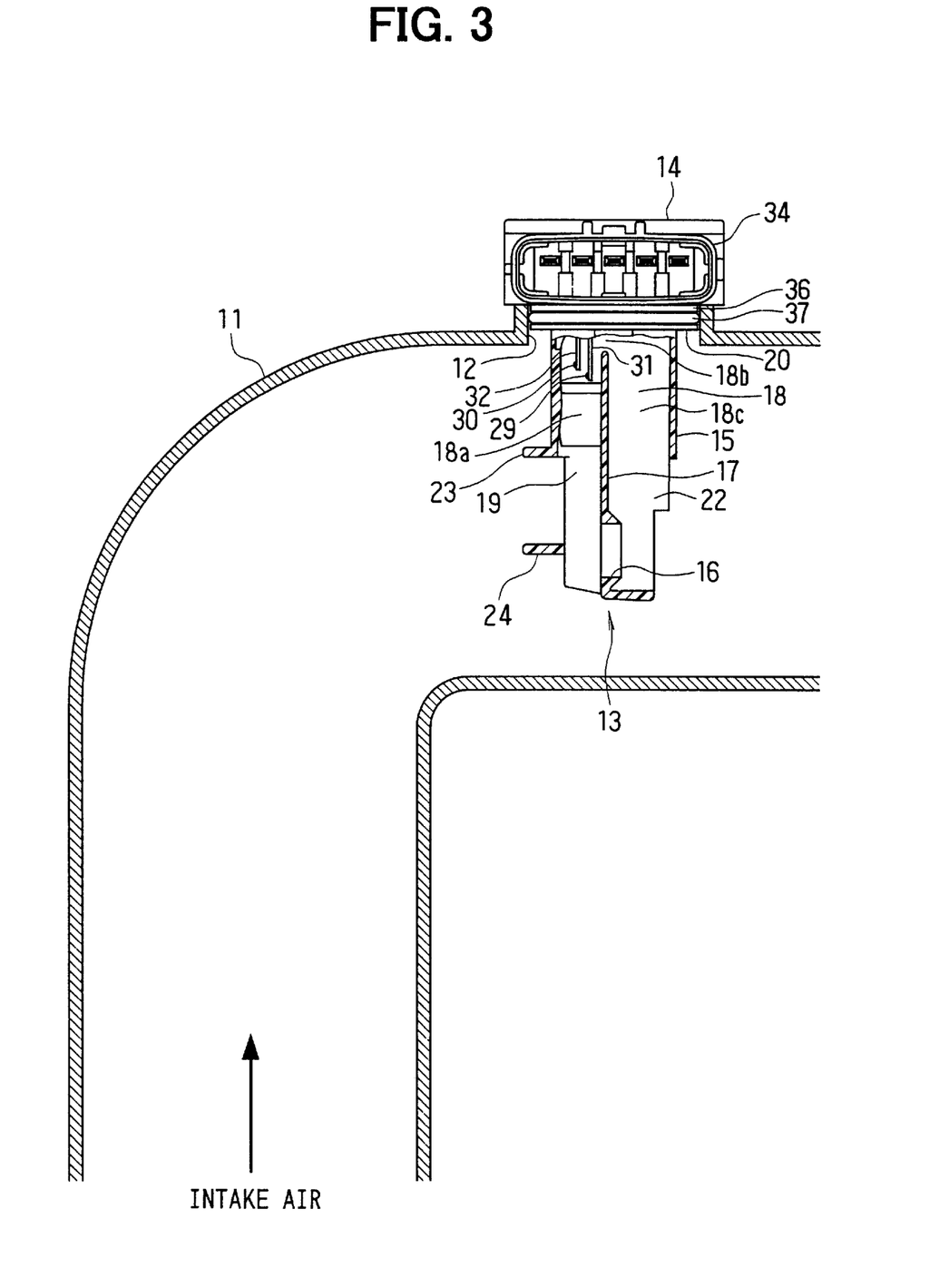
FIG. 3 is a cross-sectional side view showing a bent intake pipe and an attachment position of the air flow meter.
Figure 4A:
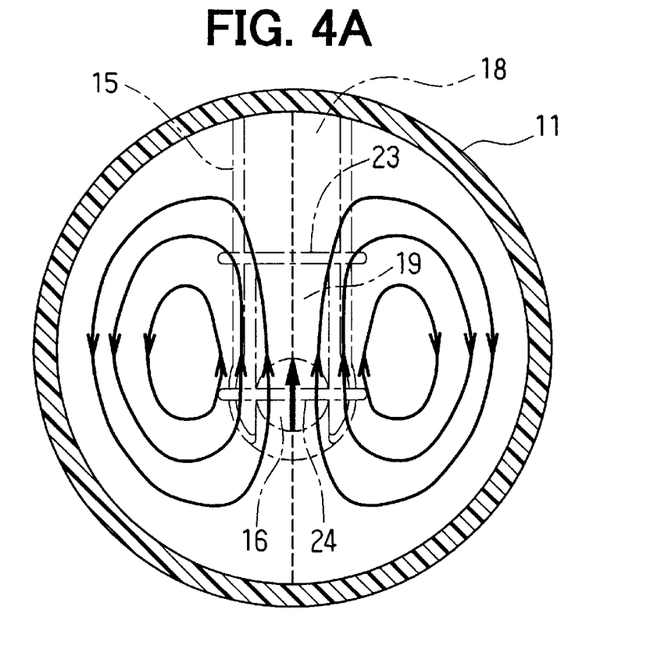
FIG. 4A is a schematic view showing a stationary secondary air flow in the intake pipe.
Figure 4B:
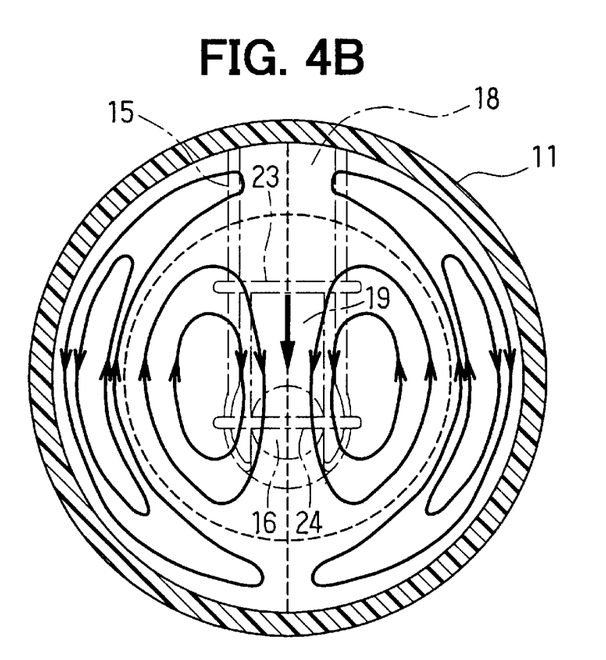
FIG. 4B is a schematic view showing a pulsating secondary air flow in the intake pipe.

Next, functions of the turbulence reduction plates 23, 24 will be explained. In the intake pipe 11, as shown in FIGS. 4A and 4B, there arises a secondary air flow in addition to the primary air flow, and direction of which is parallel with the center axis C of the intake pipe 11. The secondary air flow swirls in the intake pipe 11. When the intake pipe is bent as shown in FIG. 3, the secondary air flow remarkably arises as shown in FIGS. 4A and 4B. The secondary air flow arises due to transmission of engine intake air fluctuation. As shown in FIG. 4A, even when the air flow is stationary flow, two secondary flows arises symmetrically in the intake pipe 11. When the intake air fluctuation increases and the air flow in the intake pipe 11 becomes pulsating flow, the stationary secondary flow is pushed outwardly as shown in FIG. 4B. Thereby, there arises a pulsating secondary flow at the center area of the intake pipe 11 swirling in the opposite swirling direction of the stationary secondary flow.

Here, as shown in FIG. 4A, direction of the stationary secondary flow around the air inlet 19 is approximately the same as of the stationary secondary flow in the upstream side fluid passage 18a. However, as shown in FIG. 4B, direction of the pulsating secondary flow around the air inlet 19 is approximately opposite to the direction of the pulsating secondary flow in the upstream side fluid passage 18a.

In the conventional air flow meter, the turbulence reduction plates 23, 24 are not provided around the air inlet 19 of the bypass passage 18. Thus, when the direction of the secondary flow around the air inlet 19 is approximately the same as the secondary flow in the upstream side fluid passage 18a, amount of the air introduced into the bypass passage 18 increases due to the secondary flow. When the direction of the secondary flow around the air inlet 19 is approximately opposite to the direction of the stationary flow in the upstream side fluid passage 18a, the air is prevented from flowing into the bypass passage 18, thereby reducing the air flow amount into the bypass passage 18. Thus, fluctuation of the secondary flow direction causes fluctuation of the air flow amount into the bypass passage 18, thereby introducing a measurement error.

However, in the present embodiment, the turbulence reduction plates 23, 24 are formed at the upper side and the lower side of the air inlet 19, respectively. The turbulence reduction plates 23, 24 are substantially formed in parallel with the primary air-flow direction, and perpendicularly to the air flow in the bypass passage 18. Thus, the turbulence reduction plates 23, 24 shut both stationary secondary flow and pulsating secondary flow at the front of the air inlet 19, thereby reducing the influence of the secondary flows. Accordingly, flow of the air introduced into the bypass passage 18 is stabilized, so that the intake air flow amount is accurately measured.

Further, since the lower turbulence reduction plate 24 is located at the position facing the center of the venturi 16, the turbulence reduction plate 24 prevents the primary air flow into the venturi 16 from being disordered. Thus, stable venturi effect can be attained. The venturi 16 introduces negative pressure around the air outlet 22 of the bypass passage 18, and the negative pressure sucks the air inside the bypass passage 18 to increase the air flow speed in the bypass passage 18.

Figure 5:
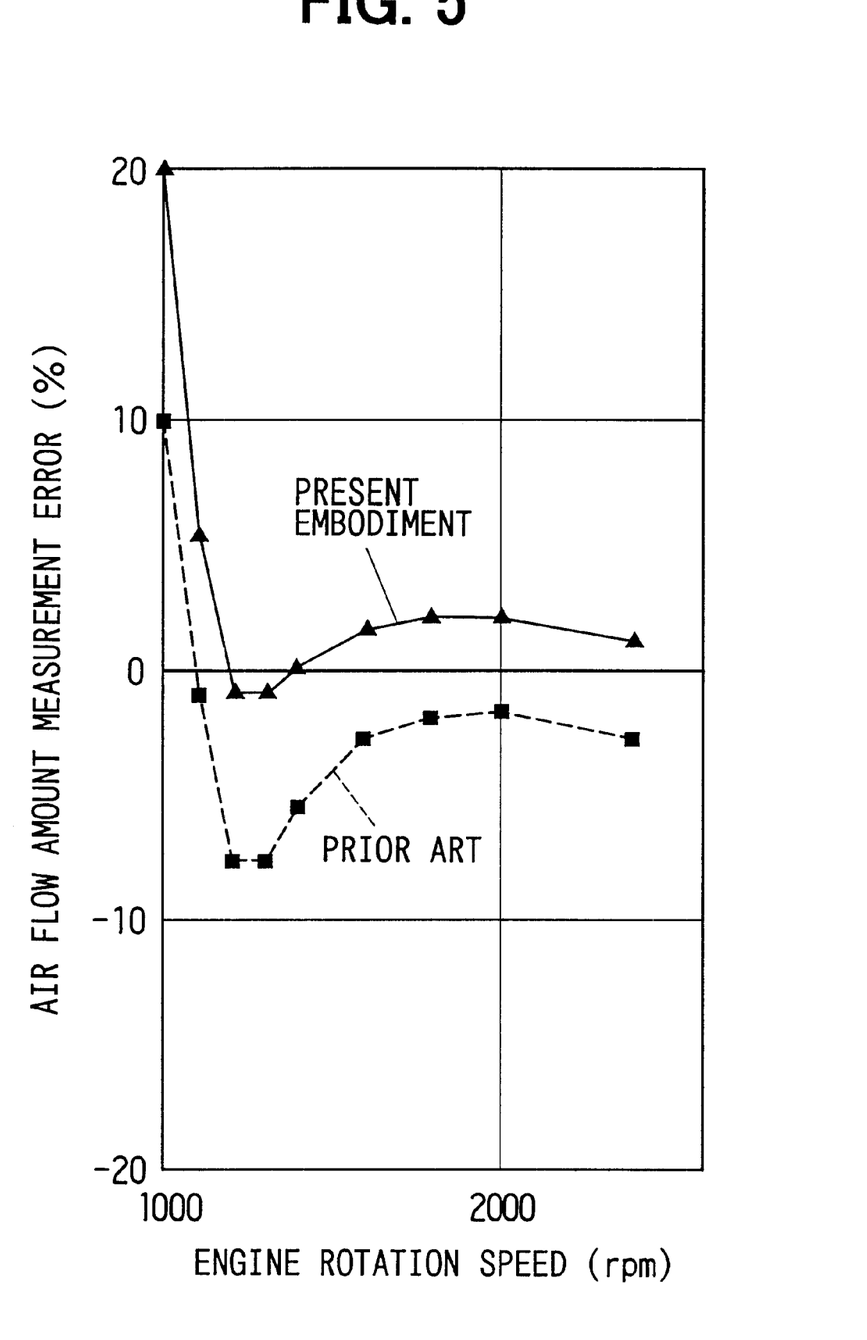
FIG. 5 is a graph showing experimental data of measurement errors in the present air flow meter and in a conventional air flow meter.

For example, as shown in FIG. 5, in the conventional air flow meter, measurement error of the intake air flow amount is relatively large at an engine normal rotation speed range 1200–2500 rpm. In the present embodiment, the turbulence reduction plates 23, 24 stabilize the air flowing into the bypass passage 18, so that the measurement error of the intake air flow amount is reduced.

Here, when the engine rotation speed is lower than about 1100 rpm, the measurement error of the intake air flow amount is abruptly increased, because back air flow arises when the engine rotation speed is low. In a hot-wire type air flow meter 13, since back flow is not distinguished from fair flow, the back flow is measured as the fair flow, so that the measured intake air flow amount becomes larger than the actual flow amount by back flow amount.

In the present embodiment, since the turbulence reduction plates 23, 24 are arranged in parallel with the primary air flow direction in the intake pipe 11, pressure loss due to the turbulence reduction plates 23, 24 is enough small, thereby introducing no influence on an engine efficiency. The turbulence reduction plates 23, 24 are simply provided, so that manufacturing cost is reduced.

(Modifications)

According to the above-described embodiment, the turbulence reduction plates 23, 24 are formed at the upper side and the lower side of the air inlet 19, respectively. Alternatively, only one turbulence reduction plate 23 or 24 may be provided. The measurement error of the intake air flow amount is caused by two secondary flows of which direction is the same as the air flow direction in the upstream side fluid passage 18a, and of which direction is opposite to the air flow direction in the upstream side fluid passage 18a. The influence of the former is larger than that by the latter. Thus, when only one turbulence reduction plate is provided, the turbulence reduction plate had better be disposed at the lower side of the air inlet 19, that is, the turbulence reduction plate had better be disposed at an opposite side of the flow meter element 29. By this, the turbulence reduction plate shut the secondary flow whose direction is the same as the air flow direction in the upstream side fluid passage 18a, which worst influence air flow amount measurement, at the front of the air inlet 19, thereby reducing the influence of the secondary flow effectively.

In the above-described embodiment, the turbulence reduction plate 23, 24 are integrally formed around the air inlet 19 of the bypass passage 18 without increasing the manufacturing cost. Alternatively, a separate turbulence reduction plate may be adhered, screwed, or mechanically fixed to the bypass passage.

In the above-described embodiment, the turbulence reduction plate 23, 24 are arranged perpendicularly to the air flow in the bypass passage 18 for reducing the influence of the secondary flow. Alternatively, as long as the influence of the secondary flow is reduced, other turbulence reduction member may be used.

Figure 6:
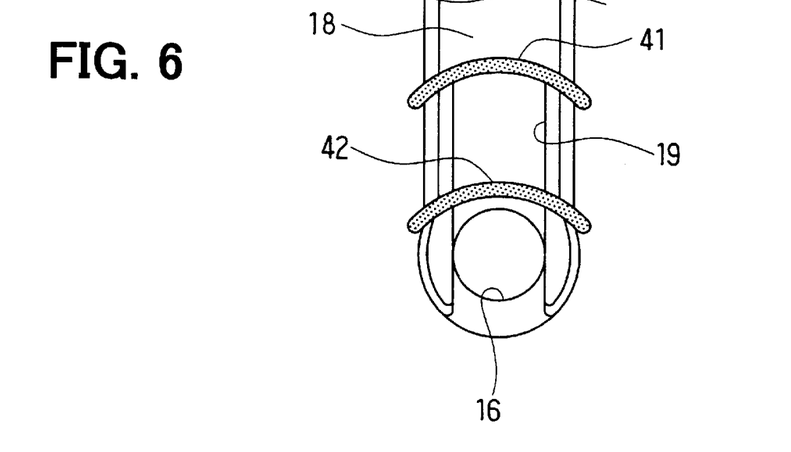
FIG. 6 is a front view showing a turbulence reduction member (first modification)
Figure 7:
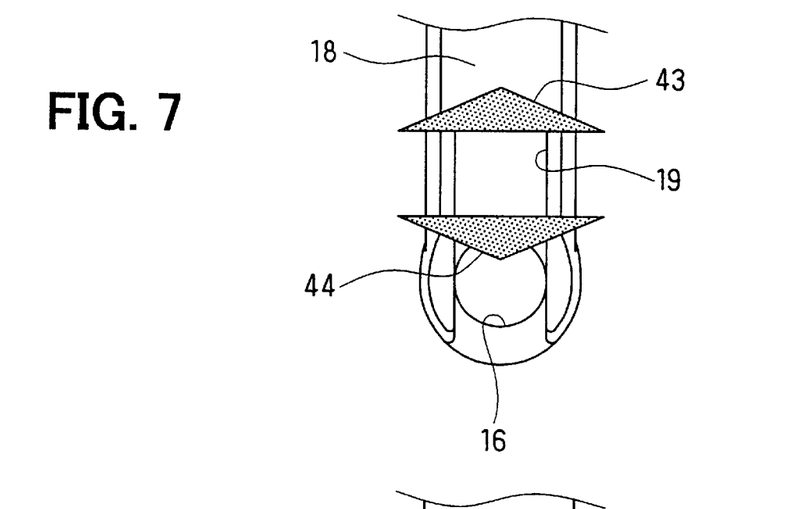
FIG. 7 is a front view showing a turbulence reduction member (second modification)
Figure 8:
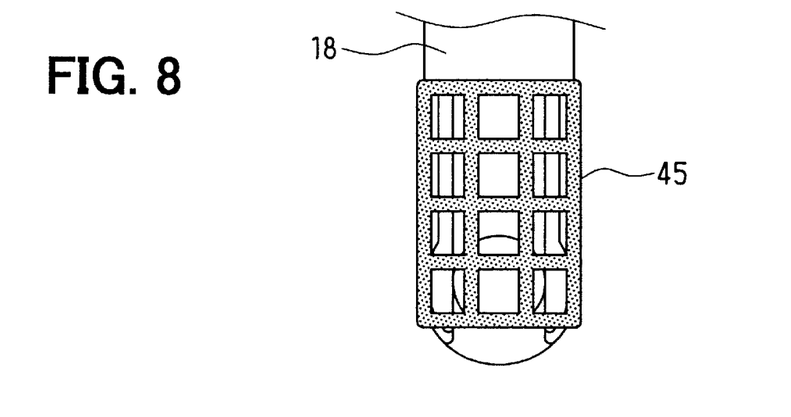
FIG. 8 is a front view showing a turbulence reduction member (third modification).

For example, as shown in FIG. 6, arc-like bent turbulence reduction members 41, 42 may be provided. As shown in FIG. 7, cross-sectional triangle turbulence reduction members 43, 44 may be provided. As shown in FIG. 8, a grille-like turbulence reduction member 45 may be provided. That is, the turbulence reduction members 41–45 having a surface approximately perpendicular to the air flow direction in the bypass passage 18 may be provided around the air inlet 19. By this, the turbulence reduction members 41–45 shut the secondary flow around the air inlet 19, thereby reducing the influence of the secondary flow. Thus, flow of the air introduced into the bypass passage 18 is stabilized, so that the intake air flow amount is accurately measured.

In this case, the turbulence reduction members 41–45 had better protrude around the air inlet 19 and toward the upstream side of the intake pipe 11.

Further, as shown in FIGS. 6–8, the turbulence reduction members 41–45 had better be entirely formed over the air inlet 19. By this, the turbulence reduction members 41–45 further effectively shut the secondary flow.

Here, the turbulence reduction members 41–45 may be screwed, adhered, or mechanically fixed to the bypass passage 18. However, the turbulence reduction members 41–45 are desired to be integrally resin-formed with the bypass passage 18 for reducing the manufacturing cost.

The present invention is not restricted to be used for the air flow meter for measuring intake air flow amount in an internal combustion engine, and may be used for measuring air flow amount in miscellaneous air passages.

What is claimed is:

1. An air flow meter for measuring flow amount of air flowing in an air passage, comprising:
    a U-shaped bypass passage, into which a part of the air is introduced, provided in said air passage, said bypass passage arranged substantially perpendicularly to a primary air flow direction in said air passage and defining an air inlet;
    a flow meter element disposed in said bypass passage; and
    a turbulence reduction plate provided adjacent the air inlet of said bypass passage, wherein
        said turbulence reduction plate extends substantially in parallel with the primary air flow direction in the air passage, and substantially perpendicularly to an air flow direction in said bypass passage,
        said turbulence reduction plate is disposed at a position of said air inlet, which is opposite to said flow meter element,
        said bypass passage includes two fluid passages next to and in parallel with each other, and a bent portion connecting the two fluid passages,
        the two fluid passages are partitioned by a partition wall,
        a venturi is formed within said partition wall at the air inlet side thereof, and
        said turbulence reduction plate is disposed at a position facing around a center of said venturi.

2. An air flow meter according to claim 1, wherein said turbulence reduction plate is integrally formed with said bypass passage.

3. The air flow meter according to claim 1, wherein said turbulence reduction plate is provided in the air passage and extends in the air passage substantially in parallel with the primary air flow direction and substantially perpendicularly to the air flow direction in said bypass passage.

4. The air flow meter according to claim 1, wherein said turbulence reduction plate reduces a secondary, turbulent flow of the primary air flow having an air flow direction component parallel to the air flow direction in said bypass passage.

5. The air flow meter according to claim 1, wherein the turbulence reduction plate is disposed on an upstream side of the air inlet of said bypass passage and extends in an upstream direction of the primary flow in the air passage.

6. The air flow meter according to claim 1, wherein the turbulence reduction plate is generally planar and is defined in a plane perpendicular to the air flow direction in said bypass passage.

7. The air flow meter according to claim 1, wherein a plurality of turbulence reduction plates are provided adjacent the air inlet, one of said turbulence reduction plates extending in an upstream direction of the primary flow from a vicinity of an upstream edge of the air inlet of the bypass passage and a second of said turbulence reduction plates disposed adjacent and upstream of said venturi.

8. The air flow meter according to claim 1, wherein said turbulence reduction plate comprises a curved plate.

9. An air flow meter for measuring flow amount of air flowing in an air passage, comprising:
 a U-shaped bypass passage, into which a part of the air is introduced, provided in said air passage, said bypass passage arranged substantially perpendicularly to a primary air flow direction in said air passage and defining an air inlet;
 a flow meter element disposed in said bypass passage; and
 a turbulence reduction plate provided adjacent the air inlet of said bypass passage, wherein
  said turbulence reduction plate extends substantially in parallel with the primary air flow direction in the air passage, and substantially perpendicularly to an air flow direction in said bypass passage, and
  said turbulence reduction plate is mechanically fastened to said bypass passage structure.

10. An air flow meter for measuring flow amount of air flowing in an air passage, comprising:
 a U-shaped bypass passage, into which a part of the air is introduced, provided in said air passage, said bypass passage arranged substantially perpendicularly to a primary air flow direction in said air passage and defining an air inlet;
 a flow meter element disposed in said bypass passage; and
 a turbulence reduction member provided in the air passage adjacent the air inlet of said bypass passage, wherein
  said turbulence reduction member includes a component extending in the air passage in a direction perpendicularly crossing with an air flow direction in said bypass passage, and
  said turbulence reduction member protrudes around said air inlet and toward an air upstream side of said air passage.

11. An air flow meter according to claim 10, wherein said turbulence reduction member is integrally formed with said bypass passage.

12. An air flow meter according to claim 10, wherein said turbulence reduction member is disposed at a position of said air inlet, which is opposite to said flow meter element.

13. An air flow meter according to claim 12, wherein
 said bypass passage includes two fluid passages next to and in parallel with each other, and a bent portion connecting the two fluid passages,
 the two fluid passages are partitioned by a partition wall,
 a venturi is formed within said partition wall at the air inlet side thereof, and
 said turbulence reduction member is disposed at a position facing around a center of said venturi.

14. An air flow meter according to claim 10, wherein said turbulence reduction plate reduces a secondary, turbulent flow of the primary air flow having an air flow direction component parallel to the air flow direction in said bypass passage.

15. The air flow meter according to claim 10, wherein the turbulence reduction plate is disposed on an upstream side of the air inlet of said bypass passage and extends in an upstream direction of the primary flow in the air passage.

16. An air flow meter for measuring flow amount of air flowing in an air passage, comprising:
 a U-shaped bypass passage, into which a part of the air is introduced, provided in said air passage, said bypass passage arranged substantially perpendicularly to a primary air flow direction in said air passage and defining an air inlet;
 a flow meter element disposed in said bypass passage; and
 a turbulence reduction member provided in the air passage adjacent the air inlet of said bypass passage, wherein
  said turbulence reduction member includes a component extending in the air passage in a direction perpendicularly crossing with an air flow direction in said bypass passage, and
  wherein said turbulence reduction member is entirely formed over said air inlet.

17. An air flow meter according to claim 16, wherein said turbulence reduction member is integrally formed with said bypass passage.

18. An air flow meter according to claim 16, wherein said turbulence reduction member is disposed at a position of said air inlet, which is opposite to said flow meter element.

19. An air flow meter according to claim 18, wherein
 said bypass passage includes two fluid passages next to and in parallel with each other, and a bent portion connecting the two fluid passages,
 the two fluid passages are partitioned by a partition wall,
 a venturi is formed within said partition wall at the air inlet side thereof, and
 said turbulence reduction member is disposed at a position facing around a center of said venturi.

20. An air flow meter according to claim 16, wherein said turbulence reduction plate reduces a secondary, turbulent flow of the primary air flow having an air flow direction component parallel to the air flow direction in said bypass passage.

21. The air flow meter according to claim 16, wherein the turbulence reduction plate is disposed on an upstream side of the air inlet of said bypass passage and extends in an upstream direction of the primary flow in the air passage.

22. An air flow meter for measuring flow amount of air flowing in an air passage, the air passage defining a primary flow direction of air flow therethrough, air flow in the air passage including a secondary flow which is substantially perpendicular to the primary flow direction, said air flow meter comprising:

a bypass passage disposed in the air passage, the bypass passage having an upstream passage extending substantially perpendicular to the primary flow direction, the upstream passage having an air inlet which is opened toward an upstream of the primary flow;

a flow meter element disposed in the upstream passage; and a turbulence reduction plate disposed adjacent the air inlet, the turbulence reduction plate being disposed on an outside of the bypass passage and extending in an upstream direction of the primary flow, the turbulence reduction plate extending substantially in parallel with the primary flow direction and substantially perpendicularly to a flow direction of the secondary flow, thereby reducing the secondary flow before entering the air inlet, wherein the turbulence reduction plate is a first plate disposed on one side of the air inlet, and further comprising a second turbulence reduction plate disposed on another side of the air inlet, the second plate being disposed outside the bypass passage and extending in an upstream direction of the primary flow, the second plate extending substantially in parallel with the primary flow direction and substantially perpendicularly to the flow direction of the secondary flow, thereby reducing the secondary flow before entering the air inlet.

* * * * *